(12) United States Patent
Shimazu

(10) Patent No.: US 6,743,537 B2
(45) Date of Patent: Jun. 1, 2004

(54) HYDROGEN GAS GENERATING SYSTEMS, FUEL CELL SYSTEMS AND METHODS FOR STOPPING OPERATION OF FUEL CELL SYSTEM

(75) Inventor: Takashi Shimazu, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 168 days.

(21) Appl. No.: 10/005,145

(22) Filed: Dec. 7, 2001

(65) Prior Publication Data

US 2002/0071975 A1 Jun. 13, 2002

(30) Foreign Application Priority Data

Dec. 11, 2000 (JP) ........................................ 2000-375380

(51) Int. Cl.⁷ .............................. H01M 8/06; C01B 3/26
(52) U.S. Cl. ........................ 429/17; 422/105; 423/652; 429/20; 429/24
(58) Field of Search .............................. 429/17, 19, 20, 429/24; 423/652, 653, 654; 422/105

(56) References Cited

U.S. PATENT DOCUMENTS 4,965,143 A * 10/1990 Mizuno et al. ............... 429/17
6,290,877 B2 * 9/2001 Naka et al. ............. 423/652 X
6,521,204 B1 * 2/2003 Borup et al. ................. 423/652
6,562,496 B2 * 5/2003 Faville et al. ............. 429/17 X
2003/0054212 A1 * 3/2003 Ueda et al. .................... 429/19
2003/0087138 A1 * 5/2003 Margiott et al. .............. 429/17

FOREIGN PATENT DOCUMENTS

| JP | 63310704 A | 12/1988 | ............ C01B/3/38 |
|---|---|---|---|
| JP | 02087480 A | 3/1990 | ............ H01B/8/04 |
| JP | 02132770 A | 5/1990 | ............ H01B/8/06 |
| JP | 02199001 A | 8/1990 | ............ C01B/3/32 |
| JP | 03005301 A | 1/1991 | ............ C01B/3/38 |
| JP | 04119902 A | 4/1992 | ............ C01B/3/42 |
| JP | A 5-266907 | 10/1993 | ............ H01M/8/04 |
| JP | A 6-203865 | 7/1994 | ............ H01M/8/04 |
| JP | 11-67251 | * 3/1999 | ............ H01M/8/04 |
| JP | 2000021431 A | 1/2000 | ............ H01M/8/04 |

* cited by examiner

*Primary Examiner*—Stephen Kalafut
(74) *Attorney, Agent, or Firm*—Oliff & Berridge, PLC

(57) ABSTRACT

In a system for generating hydrogen gas by reforming raw material, steam is continuously supplied while the supply of raw material and air to a reforming unit is stopped, so as to purge residual flammable material within the system with steam such that even if oxygen is supplied, heat generated by a reaction between the residual flammable material within the system and the oxygen does not effect the system, and the steam is removed from the system by air purging so as to prevent adverse effects from condensation.

36 Claims, 5 Drawing Sheets

US 6,743,537 B2

HYDROGEN GAS GENERATING SYSTEMS, FUEL CELL SYSTEMS AND METHODS FOR STOPPING OPERATION OF FUEL CELL SYSTEM

INCORPORATION BY REFERENCE

The disclosure of Japanese Patent Application No. 2000-375380 filed on Dec. 11, 2000 including the specification, drawings and abstract is incorporated herein by reference in its entirety.

BACKGROUND OF THE INVENTION

1. Field of Invention

The invention relates to hydrogen gas generating systems for generating hydrogen gas by reforming raw material. This invention also relates to methods for stopping operation of fuel cell systems, which use the hydrogen gas generating systems.

2. Description of Related Art

Fuel cells generally generate electricity by an electrochemical reaction between hydrogen gas and oxygen in the air. Hydrogen gas is generated, for example, by reforming raw material. Generally, natural gas, gasoline or other hydrocarbon, alcohol, ethyl, aldehyde, or the like, may be used as the raw material. Reformed gas containing hydrogen and carbon monoxide is generated by reforming these raw materials. Due, however, to the fact that carbon monoxide is a toxic substance that poisons the electrodes of fuel cells, reformed gas is usually supplied to the fuel cell after being treated, so that only the carbon monoxide is selectively oxidized.

When stopping operation of a fuel cell system, which includes a unit for generating reformed gas (hereinafter referred to as hydrogen gas) by reforming and a fuel cell, it is necessary to discharge the flammable gas containing carbon, etc., deposited during reforming, as well as toxic gas from the system. This discharge prevents against adverse effects, such as the harmful effects from these gasses leaking from the system and the poisoning of the electrodes of the fuel cell caused by these gasses, from occurring within the system. As art related to the above-mentioned object, there has been art in which, when stopping operation of a fuel cell system, inert gas is supplied into the system, so as to purge residual flammable material inside the system.

With this type of system, however, it is necessary to store an inert gas for purging in a separate tank beforehand. Because the inert gas is unable to be used for either reforming and generating electricity, storing the inert gas only for purging requires a large waste of both storage space and operating costs.

On the other hand, no other gas than inert gas appeared suitable for purging the residual flammable material. For example, if a gas containing oxygen is supplied to the system, the flammable component in the residual flammable material within the system reacts with the oxygen to generate heat, and this heat may have an effect on the system. And if a gas containing steam is supplied, condensation is generated in the system after purging, which not only makes restarting of the system difficult, but may also decrease the catalytic performance of the fuel cell. Moreover, if there is condensation at a low temperature, there is the possibility of the system freezing inside. In consideration of these adverse effects, it was necessary to use inert gas as a purge gas despite the waste in storage space and costs.

SUMMARY OF THE INVENTION

In order to solve the foregoing problems, it is an object of the invention to provide an invention for purging residual flammable material within a system without relying on inert gas.

In order to solve the foregoing problems, hydrogen gas generating systems according to the invention generate hydrogen gas by reforming a raw material, and purge during stopping of the operation of the system using steam and air, which are gasses that are used also during operation of the system. Each of the various problems exemplified above are solved by controlling the supply of these gasses.

Accordingly, methods for stopping operation of hydrogen gas generating systems that generate hydrogen gas by reforming a raw material according to exemplary embodiments of the invention, comprise the step of purging a residual flammable material by supplying air into the hydrogen gas generating system when it is determined that there is no effect on the hydrogen gas generating system from heat generated by a reaction of residual flammable material within the hydrogen gas generating system and oxygen.

Methods according to the invention for stopping operation of fuel cell systems comprising a hydrogen gas generating system, which generates hydrogen gas by reforming a raw material and a fuel cell, which generates electricity using the generated hydrogen, comprise the step of purging a residual flammable material by supplying air when it is determined that there will be no effect on the hydrogen gas generating system and the fuel cell from heat generated by a reaction between a residual flammable material within the hydrogen gas generating system and the fuel cell and oxygen.

Hydrogen gas generating systems according to the invention for generating hydrogen gas by reforming a raw material, comprise a reforming portion for reforming an air supply portion for supplying air to the reforming portion and a control portion for controlling the air supply portion during a stopping operation, so as to supply air into the reforming portion when it is determined that that there will be no effect on the hydrogen gas generating system from heat generated by a reaction between a residual flammable material within the reforming portion and oxygen.

Fuel cell systems according to the invention comprising a hydrogen gas generating system, which generates hydrogen gas by reforming a raw material and a fuel cell, which generates electricity using the generated hydrogen, comprise a reforming portion for reforming an air supply portion for supplying air to the reforming portion and a control portion for controlling the air supply portion during a stopping operation, so as to supply air into the reforming portion when it is determined that there will be no effect on the hydrogen gas generating system from heat generated by a reaction between a residual flammable material within the reforming portion and oxygen.

DETAILED DESCRIPTION OF PREFERRED EMBODIMENTS

Figure 1:
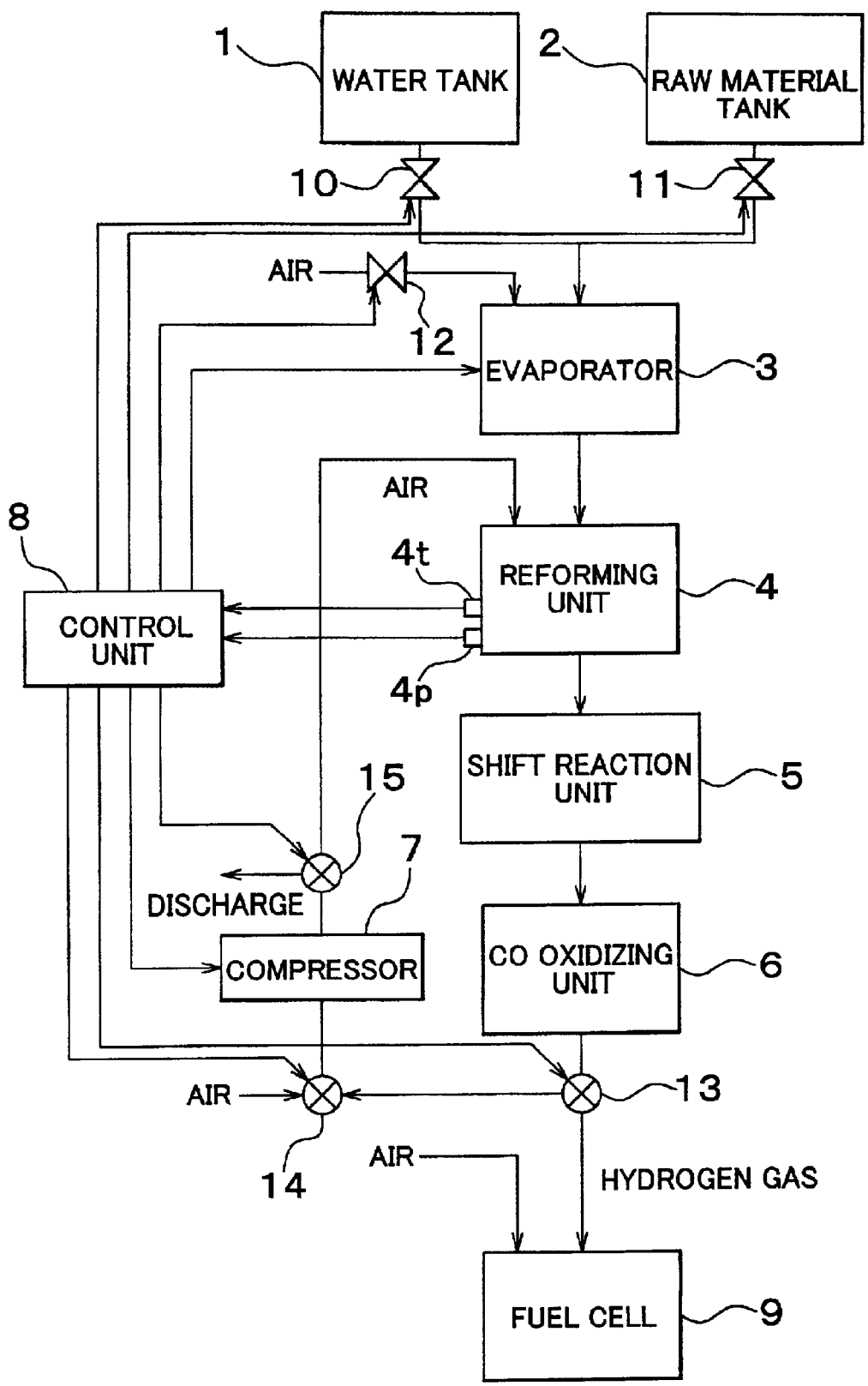
FIG. 1 is an explanatory view showing an outline of a fuel cell system according to an exemplary embodiment of the invention.

According to the invention, operation of a hydrogen gas generating system is stopped after an air purging step has been performed. In this air purging step, residual flammable material is forcefully discharged by supplying air into the system. This air purging step is performed when it is determined that the environment condition has become such that overheating generated by a reaction of residual flammable material and oxygen does not occur.

When air as the purge gas is supplied, hydrogen, carbon monoxide, carbon, and the like, in the residual flammable material reacts with the oxygen to generate heat, which may have an adverse effect on the system. This invention focuses on the fact that the heat generated by these gasses has an effect on the system in a high temperature atmosphere. If the system is at a low temperature, hydrogen, carbon monoxide, carbon, and the like, within the residual flammable material does not react with oxygen. However, even if such reaction does occur, the heat generated will be so inconsequential that it will have almost no effect on the system. For example, when the system is under this type of low temperature condition, it is possible to use air as the purge gas.

In determining whether the aforementioned condition is met based on the temperature of the system, because the environment condition is not met immediately after stopping operation of the system due to the fact that the temperature is high, air purging during the stopping operation of the system is not possible. After the temperature of the system drops sufficiently, however, the condition is met and air purging is able to be performed. Determination of the environment condition based on the temperature in this way can be done based, for example, on results from measuring the temperature within the system. This determination may also be based on the amount of time that passes after operation of the system has stopped, i.e. on the amount of time that passes after the supply of raw material has been stopped. The determination may also be based on the pressure of the system.

The environment condition may also be determined based on various components of the residual flammable material. That is, if the amount of the predetermined component in the residual flammable material, which generates heat via a reaction with oxygen, is small, then air purging can be done even in a high temperature environment. In order to lower the concentration of the predetermined component within this residual flammable material, it is effective to purge using a gas containing oxygen prior to the air purging step.

From this viewpoint, according to the invention it is preferable to perform the steam purging step prior to performing the air purging step. In the steam purging step, steam is supplied so as to forcefully discharge at least one component of the residual flammable material. This steam purging step enables purging of a predetermined or selected component within the residual flammable material. Further, steam purging is also advantageous in that it promotes a temperature decrease of the system. Because the steam is also a gas used in reforming, steam purging obviates the need for a special additional structure beyond the structure of the system. Also according to the invention, because air purging is performed after the steam purging step, adverse effects due to the condensation of steam, as well as adverse effects due to moisture freezing, can be prevented.

In the case of a predetermined or selected component within the residual flammable material being used in the determination of the environment conditions, that determination can be made, for example, according to the period of time for which the steam purging step is performed. The period of time possible for substantially replacing the initial residual flammable material with steam after purging begins may be determined beforehand by testing or the like.

In the steam purging step, it is preferable that the steam be supplied at a pressure that is lower than a saturated vapor pressure in order to inhibit condensation.

In embodiments using both the steam purging step and the air purging step, it is preferable to switch from the steam purging step to the air purging step based on the temperature or pressure within the hydrogen gas generating system. Switching based on the temperature or pressure makes it possible to switch at an appropriate timing. It is preferable that switching be set considering, for example, the probability that the steam may condense, as well as the probability that overheating may not occur by a reaction with the oxygen. The probability that the steam may condense can be determined based on whether or not the pressure of the supplied steam exceeds the saturated vapor pressure according to the temperature decrease within the system. It is preferable that steam purging be completed when the pressure of the steam is about to exceed the saturated vapor pressure, at the very latest. The probability that overheating will not occur by a reaction with the oxygen can be determined based on whether or not the temperature within the system has dropped sufficiently. It is preferable to begin air purging after the temperature within the system has dropped below the temperature at which overheating will not occur, at the very least.

Regardless of whether or not the steam purging step is performed, it is preferable to reduce the temperature of the air supplied as time passes in the air purging step. Reducing the temperature of the air that is supplied enables the temperature of the system to be lowered gradually, which prevents damage that can occur from sudden cooling.

The temperature of the air to be supplied may be either continuously cooled or cooled in stages. For example, when a vaporizing portion, which vaporizes raw material for the purpose of reforming, is supplied in a hydrogen gas generating system, superheated air is supplied by the vaporizing portion. Then, by stopping operation of the vaporizing portion and supplying air heated by the residual heat therefrom, the temperature of the air to be supplied can be lowered in stages.

This invention can be applied to various hydrogen gas generating systems, which use natural gas, gasoline or another hydrocarbon, alcohol, ethyl, aldehyde or the like as raw material. The invention is particularly well suited for a hydrogen gas generating system, which uses a hydrocarbon compound as the raw material. Reforming of the hydrocarbon compound is conducted at a high temperature that is typically between about 400° C. to about 600° C. Carbon in a higher hydrocarbon compound generally deposits easily. Under this type of high temperature, overheating tends to occur by the reaction of carbon and oxygen. Applying the invention enables purging using air while preventing such overheating. It is particularly preferable in some embodiments to perform the steam purging step and the air purging step.

According to the invention, a step of depressurizing the inside of the system may be performed after the steam purging step and the air purging step have been completed.

An absorbent material, such as a ceramic, is sometimes used in the system. The depressurizing step promotes the vaporizing of moisture absorbed in the absorbent material, to thus further inhibiting adverse effects from condensation within the system.

Next, the foregoing points will be described in detail with reference to exemplary embodiments of the invention.

First Embodiment

FIG. 1 is an explanatory view of an outline of a fuel cell system according to a first embodiment of the invention. The fuel cell system of this embodiment includes a fuel cell 9 and a hydrogen gas generating system for generating hydrogen gas to be supplied to the fuel cell 9. The fuel cell 9 generates electricity by an electrochemical reaction between hydrogen and oxygen. The fuel cell 9 may be one of a variety of different types of fuel cells. In this exemplary embodiment, the fuel cell 9 used is a polymer electrolyte fuel cell.

The hydrogen gas generating system reforms a predetermined or selected raw material to generate hydrogen gas. "Hydrogen gas" in this case refers to a hydrogen-rich gas and therefore is not limited to pure hydrogen. In this embodiment, gasoline is used as the hydrogen gas raw material. The gasoline undergoes a reforming reaction with the steam, as well as a partial oxidative reaction with the air, thereby generating hydrogen and carbon monoxide. These reactions take place in a shift reaction unit 5 described below.

The raw material stored in a raw material tank 2 is first sent to an evaporator 3 as a vaporizing portion. The amount of raw material supplied to the evaporator 3 is controlled by a valve 11. The raw material is then vaporized by the evaporator 3 and supplied to a reforming unit 4. The steam to be used for reforming the raw material is generated by vaporizing water stored in a water tank 1 with the evaporator 3. The amount of steam supplied is controlled by a valve 10. The evaporator 3 heats air introduced from the outside and is provided with a valve 12 for controlling the supply of this heated air to the reforming unit 4. This valve 12 closes when the raw material is to be reformed. The air used for reforming is introduced to the reforming unit 4 by a compressor 7 via a path that does not go through the evaporator 3. This path is provided with switching valves 14 and 15 such that during operation of the system, the switching valve 14 switches to the outside air introduction side and the switching valve 15 switches to the reforming unit 4 side.

In the reforming unit 4, a catalyst is carried for reforming the raw material. For the catalyst carrier, a support body, such as a ceramic, is used. Hydrogen and carbon monoxide are then generated when vaporized raw material, steam, and air are supplied to the reforming unit 4. Ordinarily, this reaction takes place at a high temperature of about 600° C. In the case of using a hydrocarbon type of raw material other than gasoline, it is well known that carbon deposits tend to form under the conditions in which reforming takes place, particularly with a higher hydrocarbon compound. It is therefore preferable to appropriately select reforming conditions of the reforming unit 4 which promote a reaction while at the same time inhibit the deposition of carbon.

The gas generated by the reforming unit 4 is then supplied to a shift reaction unit 5, which carries a catalyst appropriate for a shift reaction. A shift reaction in this case refers to a reaction in which carbon dioxide and hydrogen are generated from carbon monoxide and steam. This shift reaction takes places at a temperature of about 300° C. The pipe that supplies the steam to the shift reaction unit 5 is not shown.

The hydrogen gas generated by the shift reaction unit 5 is then supplied to a CO oxidizing unit 6, which carries a catalyst for selectively oxidizing carbon monoxide. In the reformed hydrogen gas, carbon monoxide is oxidized to carbon dioxide by a selective oxidative reaction. The hydrogen gas is then supplied to an anode of the fuel cell 9. A switching valve 13 is provided between the CO oxidizing unit 6 and the fuel cell 9, which, during operation, switches so as to communicate the CO oxidizing unit 6 and the fuel cell 9.

Operation of the fuel cell system is controlled by a control unit 8. The control unit 8 is a microcomputer, which includes a CPU and memory. The control unit 8 controls operation of various components within the system, such as the valves 10, 11 and 12, switching valves 13, 14 and 15, compressor 7, and evaporator 3. In order to carry out this control, various signals are input to the control unit 8. These signals include detection results sent from a pressure sensor $4p$ and a temperature sensor $4t$ provided in the reforming unit 4.

Next, operation during the stopping operation of the system according to the foregoing construction will be described.

Figure 2:
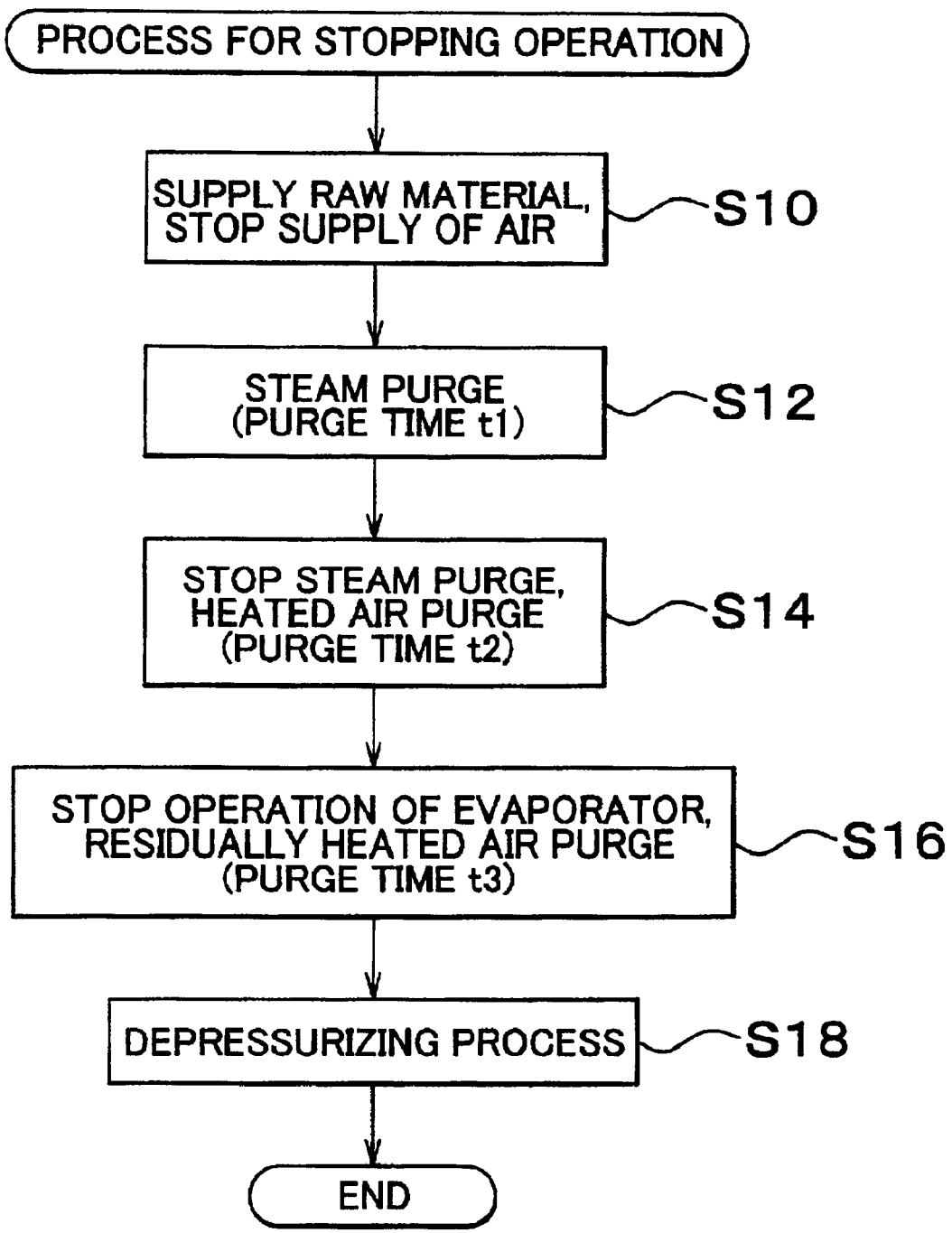
FIG. 2 is a flow chart showing a process for stopping operation of the fuel cell system.

FIG. 2 is a flow chart showing the process for stopping operation of the fuel cell system, in which the stopping operation of the system is performed by the control unit 8 controlling the valves 10, 11 and 12, and the like.

Figure 3:
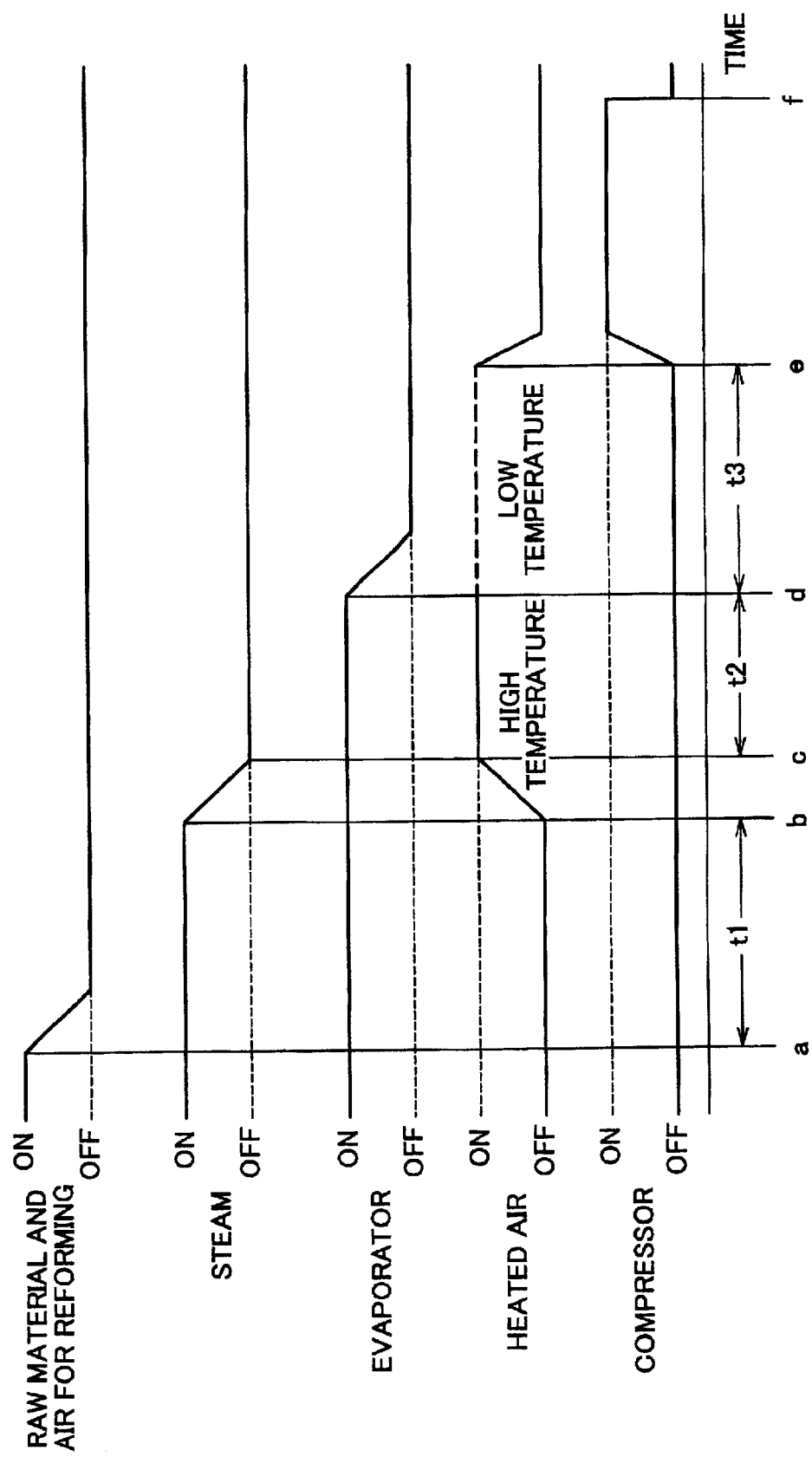
FIG. 3 is an explanatory view showing an operation state of the system during the process for stopping operation.

FIG. 3 is an explanatory view showing an operation state of the system during the process for stopping operation, which shows the supply state of the raw material and air for reforming, the supply state of the steam, the operation state of the evaporator 3, the supply state of the heated air, and the operation state of the compressor 7, respectively.

Referring to FIGS. 2 and 3, the operation for stopping operation of the system is as follows. When stopping operation of the system, the control unit 8 first closes the valves II and 12 so as to stop the supply of raw material and air to the reforming unit 4 (Step S10 and time a in FIG. 3).

Meanwhile, steam is continued to be supplied to the reforming unit 4, and steam purging is carried out within the system (Step S12). Steam purging is continued for only a preset time t1. Time t1 can be set taking into consideration an environment condition in which it is possible to start heated air purging, which will be described later. The environment condition in this case is a condition in which excessive heat generation, caused by carbon or the like, which is a flammable component contained in the residual flammable material in the system and which is deposited during reforming, coming into contact with oxygen in the air, does not occur. More specifically, the temperature within the system sufficiently dropping and the flammable component and carbon being substantially discharged from within the system can be used as conditions. According to this embodiment, the flammable component and carbon being substantially discharged from within the system is made a condition, and the time in which the residual gas within the system immediately after operation thereof has stopped is substantially replaced by the supplied steam is obtained by testing or the like. This time is then used as the time t1.

When steam purging, it is preferable that the steam be supplied into the system at a high pressure at which it is possible to purge the residual flammable material. On the other hand, in order to prevent condensation within the system, it is preferable to supply the steam at a pressure that does not exceed the saturated vapor pressure. Taking these two points into consideration, in this embodiment, the steam is supplied at a somewhat lower pressure than the saturated vapor pressure. Because the saturated vapor pressure depends on the temperature within the system, the pressure of the steam is set based on the temperature of the reforming unit 4, which is detected by the temperature sensor 4t. Pressure control is carried out according to the degree of opening of the valve 10 and control of a pressure regulating mechanism of the evaporator 3.

When the time t1 has passed, the control unit 8 switches from steam purging to heated air purging (Step S14 and time b, c in FIG. 3).

Steam purging is then stopped by closing the valve 10. Heated air purging is one type of air purging, and is carried out by supplying air heated by the evaporator 3 to the reforming unit 4. To do this, during the stopping operation of the system, the control unit 8 opens the valve 12 to introduce air into the evaporator 3 while continuing to operate the evaporator 3. The introduced air is then heated by the evaporator 3 and supplied to the reforming unit 4. Accordingly, purging with air of a temperature substantially equal to, or above, that during steam purging can be carried out. This heated air purging is carried out for only a preset time t2.

The heated air purging, along with residually heated air purging, which will be described later, removes moisture supplied into the system in the steam purging step. The heated air as the purge gas is used to promote drying within the system to prevent condensation and harm to the system by preventing a rapid drop in temperature. Therefore, from this perspective, the time t2 may be set as appropriate for each system. It is preferable, however, that the time t2 be short in order to keep down energy consumption incurred by operating the evaporator 3.

When the time t2 passes, the control unit 8 switches from heated air purging to residually heated air purging (Step S16 and time d in FIG. 3). Residually heated air purging in this case is one type of air purging, in which the air that is used has a temperature raised by residual heat after the control unit 8 has stopped the operation of the evaporator 3. As the temperature of the evaporator 3, which has been stopped, drops, the temperature of the residually heated air also gradually drops. Therefore, residual heat purging is able to be carried out inside the system while a drop in temperature of the entire system, including the evaporator 3, can be promoted. The residually heated air purging is continued for only a preset time t3.

The step of residually heated air purging removes moisture within the system, as well as reduces the temperature of the system. Therefore, from these perspectives, the time t3 may be set as appropriate in accordance with the system construction. The time t3 can be determined, together with the time t2 described above, according to the following method. That is, in order to facilitate cooling of the system, the minimum value of time t3 is determined, and times t2 and t3 are collectively determined within a range in which time t3 does not fall below this minimum value. The times t2 and t3 are determined taking into consideration both the fact that a shorter total time of both times enables the purging time to be reduced, and the fact that a shorter time t2 is better to keep down the amount of energy used.

When the time t3 passes, the control unit 8 stops the residually heated air purging and performs a depressurizing process in the system (Step S18 and time e in FIG. 3). The residually heated air purging is stopped by closing a valve 12, which introduces air into the evaporator 3. The depressurizing process is performed using the compressor 7. Switching the switching valves 13, 14 and 15, such that the gas inside the system is discharged through the compressor 7, while operating the compressor 7, enables the system to be depressurized. Depressurizing in this way promotes the elimination of moisture absorbed in the absorbent material, such as a ceramic materials. From these considerations, the target pressure when depressurizing may be set as appropriate within a range in which it is possible to sufficiently remove moisture. In this embodiment, the pressure is reduced until it is lower than atmospheric pressure. When the depressurizing process is complete, the control unit 8 stops operation of the compressor 7 and switches the switching valves 13, 14 and 15, such that no outside air is introduced, thereby completing the process for stopping operating of the system (time f in FIG. 3).

According to the method for stopping operation as described in the first embodiment above, there is no need to use inert gas for purging in the system. Because purging uses steam and air used during operating of the system, there is no need to provide a specific tank for stopping operation of the system. This therefore enables the system to be both reduced in size, as well as simplified in its configuration.

Furthermore, by performing the heated air purging step and the residually heated air purging step to remove moisture using air after the steam purging step, adverse effects due to condensation and the freezing of moisture within the system can be prevented.

In this embodiment, feedback control was applied based on detection results of the pressure sensor 4p. However, in other exemplary embodiments, pressure may also be controlled with an open loop.

It should be noted that, in this embodiment, switching between the different types of purging was done gradually. However, in other exemplary embodiments, switching may also be done instantaneously.

Also, the depressurizing process is a step for more completely eliminating steam, which is performed in addition to heated air purging and residually heated air purging. However, in other exemplary embodiments, this step may be eliminated. Also, the pressure may be reduced until it is equivalent to atmospheric pressure by gradually releasing the pressure within the system.

Second Embodiment

According to the first embodiment, switching from steam purging to heated air purging is done when the environment conditions are determined to be such that overheating does not occur based on the passage of time t1, which is the period of time for which steam purging is performed. According to a second embodiment, switching of the type of purging is done based on the temperature condition of the reforming unit 4.

Figure 4:
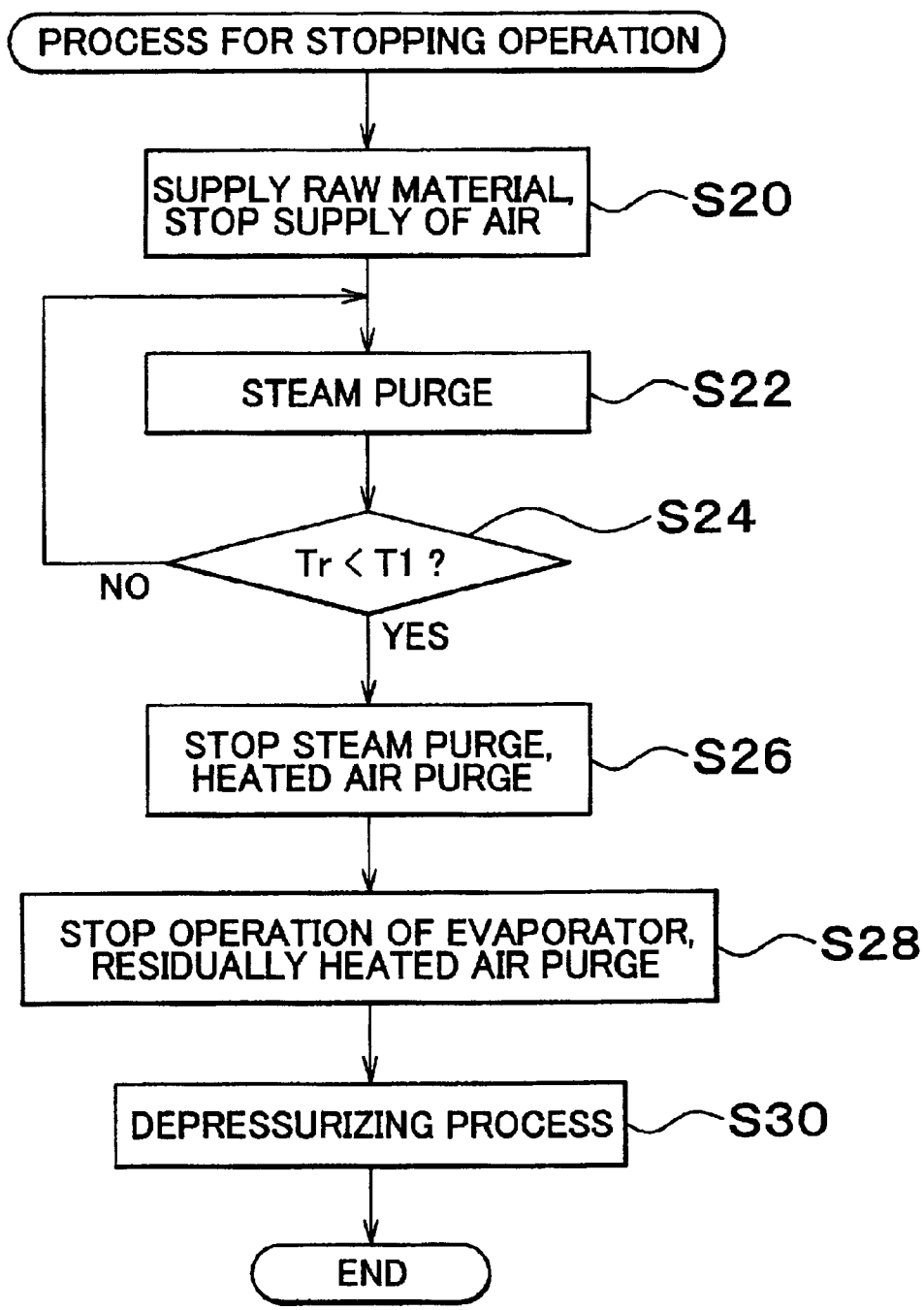
FIG. 4 is a flow chart of the process for stopping operation according to another exemplary embodiment of the invention.

FIG. 4 is a flow chart of the process for stopping operation according to the second embodiment. As in the first embodiment, the control unit 8 performs purging after stopping supply of the raw material and air to the reforming unit 4 during the stopping operation of the system (Steps S20 and S22). In the second embodiment, the steam is supplied at a constant pressure that is below the saturated vapor pressure with some margin therebetween. This steam purging is continued until a temperature Tr within the system is below a preset reference temperature T1 (Step S24).

The reference temperature T1 creates an environment condition in which adverse effects from air purging do not occur. As described above in the first embodiment, it is preferable to inhibit overheating due to the reaction between a component within the residual flammable material and oxygen within the air while performing air purging. The reference example, overheating due to the reaction of deposited carbon with oxygen occurs at a temperature of about 400° C. or above. Accordingly, it is preferable to set the reference temperature T1 sufficiently lower than 400° C.

Figure 5:
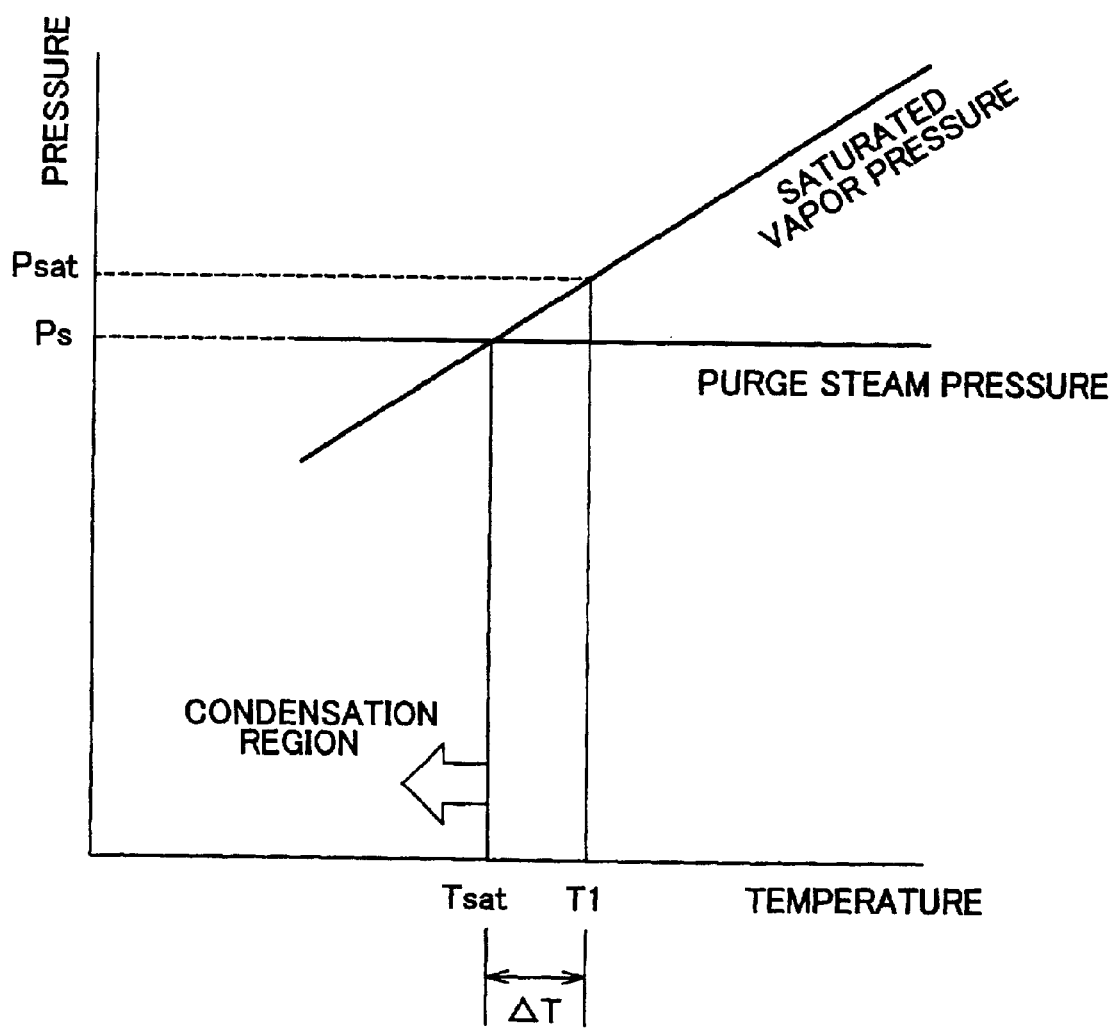
FIG. 5 is an explanatory view of a method for setting a supply pressure of steam.

The supply pressure of the steam can be set taking the reference temperature T1 into consideration. FIG. 5 illustrates an explanatory embodiment of a method for setting the supply pressure of the steam. As described above, it is preferable that the supply pressure of the steam be set in a range lower than the saturated vapor pressure. As illustrated, the saturated vapor pressure becomes lower as the temperature decreases. If the steam pressure for purging is made to be a constant value Ps, then condensation of the steam occurs in a region in which the saturated vapor pressure is below Ps, i.e., in a region in which the temperature is equal to, or less than, the critical temperature Tsat. In order to prevent this type of condensation, the pressure Ps of the purging steam is set such that the critical temperature Tsat becomes sufficiently lower than the reference temperature T1. The margin $\Delta T$ between the critical temperature Tsat and T1 (i.e., $\Delta T=T1-Tsat$) can be set arbitrarily.

When the temperature Tr in the system drops below the reference temperature T1, the control unit 8 stops the steam purging and performs heated air purging (Step S26). After heated air purging has been performed for a fixed period of time, operation of the evaporator is stopped and residually heated air purging is performed (Step S28). Then, after residually heated air purging has been performed for a fixed period of time, the depressurizing process is performed (Step S30). Because these processes are the same as in the first embodiment, a detailed description of the processes will be omitted.

Accordingly, in the second embodiment also, purging can be done without relying on inert gas, just as in the first embodiment. In addition, condensation during the purging process is able to be reliably inhibited by switching from steam purging to air purging based on the temperature within the system.

In both the first embodiment and the second embodiment, examples were given using both steam purging and air purging. However, in other exemplary embodiments, air purging alone may be used. More specifically, the system may be cooled and air purging may be performed when the temperature has dropped sufficiently. In this case as well, there is no need to store inert gas for use in purging.

Moreover, purging with inert gas may be performed instead of steam purging. In this case, because the inert gas is only used until the temperature of the system drops, the amount of the inert gas used is able to be drastically reduced. Accordingly, the storage tank for the inert gas can be reduced in size as compared with an ordinary tank.

Also, in both the first and second exemplary embodiments, an example was given in which both heated air purging and residually heated air purging were used. However, in other exemplary embodiments, either one of these two types of purging may be used alone. Furthermore, in embodiments, purging may also be done with outside air.

In both the first and second exemplary embodiments, the temperature or pressure of the reforming unit 4 was detected. However, in other exemplary embodiments, the temperature and pressure of another unit in combination with the temperature or pressure of the reforming unit 4 may be detected.

In both embodiments, steam reforming and a partial oxidative reaction were carried out in parallel. However, in other exemplary embodiments, a construction may also be employed in which only steam reforming is carried out.

In both the first and second exemplary embodiments, the invention was applied to a fuel cell system. However, in other exemplary embodiments, a system that consumes hydrogen gas is not limited to a fuel cell. In both the first and second exemplary embodiments, an example was given in which purging of the entire system as a whole was done. However, in other exemplary embodiments, a construction may also be employed in which purging is performed for each unit, such as for the reforming unit 4, the shift reaction unit 5, etc.

Also, in both the first and second exemplary embodiments, the steam of the steam purging step was supplied at a lower pressure than the saturated vapor pressure. However, because the saturated vapor pressure fluctuates depending upon the temperature and pressure within the system, in other exemplary embodiments, the steam may be supplied at a substantially constant pressure set sufficiently lower taking into consideration the temperature range and pressure range within the system. Further, the steam may be supplied while detecting the temperature and pressure within the system and controlling the pressure so as to fulfill the aforementioned conditions. The pressure control can be applied by a known mechanism such as a pressure regulating valve. The target pressure when the pressure is controlled may be stored beforehand according to its relationship with the temperature within the system. Also, the target pressure may be calculated using a relational expression such as the Clausius Clapeyron equation.

In both the first and second exemplary embodiments, gasoline, which is a hydrocarbon, was used for the raw material. However, in other exemplary embodiments when using a raw material other than a hydrocarbon, the shift reaction unit 5 may be omitted.

The invention can be applied to methods for stopping operation of various types of hydrogen gas generating systems, regardless of the intended use of hydrogen that is generated. The invention is extremely useful for a fuel cell system, particularly one which combines a hydrogen gas generating system and a fuel cell. If the invention is applied when stopping operating of the system, purging within the hydrogen gas generating system, as well as the fuel cell, can be done simultaneously. Therefore, the invention provides the advantage that it is possible to simultaneously inhibit condensation within the fuel cell.

The invention can be constructed in various forms other than a method for stopping operation as described above. For example, it may be constructed as a hydrogen gas generating system to which the above-described method for stopping operation is applied. This type of hydrogen gas generating system would generally comprise a reforming portion for reforming, an air supply portion for supplying air to the reforming portion, and a control portion for controlling the air supply portion. The control portion controls the air supply portion during the stopping operation of the system such that air is supplied to the reforming portion when it is determined that the environment condition is such that overheating by a reaction between the residual flammable material within the reforming portion and oxygen can be prevented. The reforming portion in a broad sense includes a unit for generating hydrogen gas from raw material. According to the type of raw material, hydrogen gas can be generated by a multistage chemical reaction process of a reforming reaction, shift reaction, carbon monoxide reaction, and the like.

In addition, the invention can be constructed in various forms such as a fuel cell system to which the above-described method for stopping operation is applied, or a moving body on which the fuel cell system is mounted as an energy source. In each of these constructions, it is possible to consider various additional elements as described earlier in the method for stopping operation. For example, when using air heated with the evaporating portion or with residual heat from the evaporating portion for purging, it is preferable that the air supply portion be constructed to supply air to the reformer via the evaporating portion.

Above embodiments of the invention, as well as various modifications thereof, have been described. However, the invention is not limited thereto, but can be modified without departing from the scope thereof.

In the illustrated embodiment, the controller (the CONTROL UNIT 8) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A method for stopping operation of a hydrogen gas generating system which generates hydrogen gas by reforming a predetermined raw material, comprising:

purging a residual flammable material by supplying air into the hydrogen gas generating system when it is determined that an environment condition is such that there will be no effect on the hydrogen gas generating system from heat generated by a reaction between the residual flammable material within the hydrogen gas generating system and oxygen.

2. The method according to claim 1, wherein the purging is performed by the air when an internal temperature of the hydrogen gas generating system is equal to or less than a predetermined temperature.

3. The method according to claim 1, wherein the purging is performed by the air when an internal pressure of the hydrogen gas generating system is equal to or less than a predetermined pressure.

4. The method according to claim 1, wherein the purging is performed using air having a temperature which is less than an internal temperature of the hydrogen gas generating system and drops with the passage of time.

5. The method according to claim 1, wherein the hydrogen gas generating system further comprises a vaporizing portion which vaporizes the raw material, and wherein air heated to a temperature less than an internal temperature of the hydrogen gas generating system by the vaporizing portion is supplied in the air purging.

6. The method according to claim 1, wherein the hydrogen gas generating system further comprises a vaporizing portion which vaporizes the raw material, and wherein air heated to a temperature less than an internal temperature of the hydrogen gas generating system with residual heat from the vaporizing portion after operation of the vaporizing portion has stopped is supplied in the air purging.

7. The method according to claim 1, further comprising steam purging by supplying steam into the hydrogen gas generating system prior to supplying air, so as to discharge at least one component of the residual flammable material, regardless of whether the environment condition is satisfied or not.

8. The method according to claim 7, wherein the steam is supplied at a pressure lower than a saturated water vapor pressure into the hydrogen gas generating system.

9. The method according to claim 8, wherein the pressure of the steam is determined based on a temperature inside the hydrogen gas generating system.

10. The method according to claim 8, wherein the pressure of the steam is determined based on a pressure inside the hydrogen gas generating system.

11. The method according to claim 7, wherein switching from the steam purging to the air purging is performed based on a temperature inside the hydrogen gas generating system.

12. The method according to claim 7, wherein switching from the steam purging to the air purging is performed based on a pressure inside the hydrogen gas generating system.

13. The method according to claim 7, wherein switching from the steam purging to the air purging is performed based on a period of time for which the steam purging is performed.

14. The method according to claim 7, further comprising depressurizing inside of the hydrogen gas generating system after supplying the air.

15. The method according to claim 1, further comprising inert gas purging by supplying inert gas into the hydrogen gas generating system until it is determined that an environment condition is such that there will be no effect on the hydrogen gas generating system from heat generated by a reaction between the residual flammable material within the hydrogen gas generating system and oxygen so as to discharge the residual flammable material.

16. The method according to claim 1, wherein the predetermined fuel is a hydrocarbon compound.

17. A method for stopping operation of a fuel cell system comprising a hydrogen gas generating system which generates hydrogen gas by reforming a predetermined raw material and a fuel cell which generates electricity using the generated hydrogen, comprising:

purging a residual flammable material by supplying air when it is determined that an environment condition is such that there will be no effect on the hydrogen gas generating system and the fuel cell from heat generated by a reaction between the residual flammable material within the hydrogen gas generating system and the fuel cell and oxygen.

18. The method according to claim 17, further comprising steam purging by supplying steam into the hydrogen gas generating system prior to supplying air so as to discharge at least one component of the residual flammable material, regardless of the environment condition.

19. A hydrogen gas generating system for generating hydrogen gas by reforming a predetermined raw material, comprising:

a reforming portion for reforming the raw material;

an air supply portion for supplying air to the reforming portion; and a control portion for controlling the air supply portion during a stopping operation so as to supply air into the reforming portion when it is determined that an environment condition is such that there will be no effect on the hydrogen gas generating system from heat generated by a reaction between a residual flammable material within the reforming portion and oxygen.

20. The hydrogen gas generating system according to claim 19, wherein the air supply portion supplies the air when an internal temperature of the hydrogen gas generating system is equal to or less than a predetermined temperature.

21. The hydrogen gas generating system according to claim 19, wherein the air supply portion supplies the air when an internal pressure of the hydrogen gas generating system is equal to or less than a predetermined pressure.

22. The hydrogen gas generating system according to claim 19, wherein the air supply portion supplies the air having a temperature which is less than an internal temperature of the hydrogen gas generating system and drops with the passage of time.

23. The hydrogen gas generating system according to claim 19, further comprising a vaporizing portion which vaporizes the raw material, and wherein the air supply portion supplies air heated to a temperature less than an internal temperature of the hydrogen gas generating system by the vaporizing portion.

24. The hydrogen gas generating system according to claim 19, further comprising a vaporizing portion which vaporizes the raw material, and wherein the air supply portion supplies air heated to a temperature less than an internal temperature of the hydrogen gas generating system with residual heat from the vaporizing portion after operation of the vaporizing portion has stopped.

25. The hydrogen gas generating system according to claim 19, wherein the air supply portion supplies steam into the hydrogen gas generating system prior to supplying air, so as to discharge at least one component of the residual flammable material, regardless of whether the environment condition is satisfied or not.

26. The hydrogen gas generating system according to claim 25, wherein the air supply portion supplies steam at a pressure lower than a saturated water vapor pressure into the hydrogen gas generating system.

27. The hydrogen gas generating system according to claim 26, wherein the control portion determines the pressure of the steam based on a temperature inside the hydrogen gas generating system.

28. The hydrogen gas generating system according to claim 26, wherein the control portion determines the pressure of the steam based on a pressure inside the hydrogen gas generating system.

29. The hydrogen gas generating system according to claim 25, wherein the control portion switches from the steam purging to the air purging based on a temperature inside the hydrogen gas generating system.

30. The hydrogen gas generating system according to claim 25, wherein the control portion switches from the steam purging to the air purging based on a pressure inside the hydrogen gas generating system.

31. The hydrogen gas generating system according to claim 25, wherein the control portion switches from the steam purging to the air purging based on a period of time for which the steam purging step is performed.

32. The hydrogen gas generating system according to claim 25, wherein the air supply portion depressurizes inside of the hydrogen gas generating system after supplying the air.

33. The hydrogen gas generating system according to claim 19, further comprising an inert gas tank for storing inert gas, wherein the air supply portion supplies inert gas into the hydrogen gas generating system until it is determined that an environment condition is such that there will be no effect on the hydrogen gas generating system from heat generated by a reaction between the residual flammable material within the hydrogen gas generating system and oxygen so as to forcefully discharge the residual flammable material.

34. The hydrogen gas generating system according to claim 19, wherein the predetermined fuel is a hydrocarbon compound.

35. A fuel cell system comprising a hydrogen gas generating system which generates hydrogen gas by reforming a predetermined raw material and a fuel cell which generates electricity using the generated hydrogen, comprising:

a reforming portion for reforming the raw material;

an air supply portion for supplying air to the reforming portion; and a control portion for controlling the air supply portion during a stopping operation so as to supply air into the reforming portion when it is determined that an environment condition is such that there will be no effect on the hydrogen gas generating system from heat generated by a reaction between a residual flammable material within the reforming portion and oxygen.

36. The fuel cell system according to claim 35, wherein the air supply portion supplies steam into the hydrogen gas generating system prior to supplying air, so as to discharge at least one component of the residual flammable material, regardless of the environment condition.

* * * * *